United States Patent [19]

Kanigowski

[11] Patent Number: 4,852,940

[45] Date of Patent: Aug. 1, 1989

[54] STOWABLE TABLE SYSTEM

[75] Inventor: Andrzej S. Kanigowski, La Crescenta, Calif.

[73] Assignee: Weber Aircraft Corporation, Burbank, Calif.

[21] Appl. No.: 87,667

[22] Filed: Aug. 20, 1987

[51] Int. Cl.⁴ .................................................. A47C 7/70
[52] U.S. Cl. ..................................... 297/145; 108/140;
248/181; 248/288.3; 297/155; 297/162;
297/149; 403/122
[58] Field of Search ................ 297/145, 149, 150, 154,
297/155, 161, 162; 248/482, 483, 181, 182,
288.3, 288.5; 403/122

[56] References Cited

U.S. PATENT DOCUMENTS

| | | | |
|---|---|---|---|
| 1,521,508 | 12/1924 | Denoux | 248/483 |
| 2,566,113 | 8/1951 | Bayless | 297/161 |
| 3,197,254 | 7/1965 | Hendrickson | 297/162 |
| 3,212,814 | 10/1965 | Anderson | 297/162 X |
| 3,216,765 | 11/1965 | Junkunc | 297/162 |
| 3,547,488 | 12/1970 | Barnes | 297/162 |
| 3,583,760 | 6/1971 | McGregor | 297/145 |
| 3,598,442 | 8/1971 | Miller | 297/162 |
| 4,003,598 | 1/1977 | Glaze | 297/161 X |

FOREIGN PATENT DOCUMENTS

| | | | |
|---|---|---|---|
| 2534350 | 4/1984 | France | 403/122 |
| 2579435 | 10/1986 | France | 297/162 |

Primary Examiner—Peter R. Brown
Attorney, Agent, or Firm—Lyon & Lyon

[57] ABSTRACT

A support system for a stowable table is described in which the need for separate hinge mechanisms to accommodate pivotal movement of the table in the principle planes of its movement is obviated by means of a single, spherical hinge arrangement permitting substantially universal movement of the table between its stowed position and various positions of use.

11 Claims, 4 Drawing Sheets

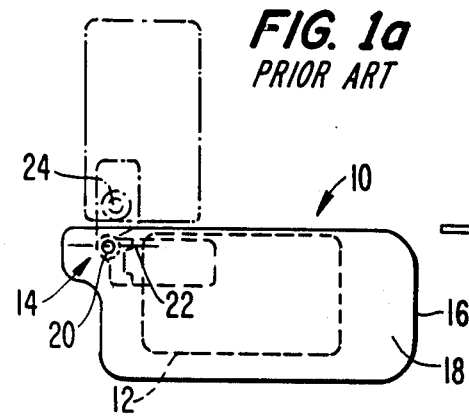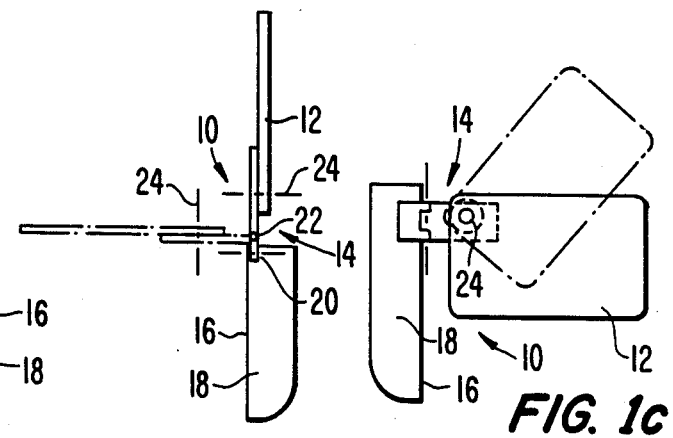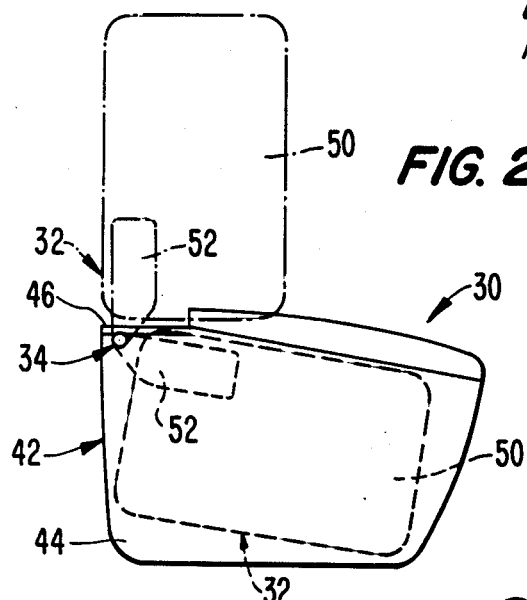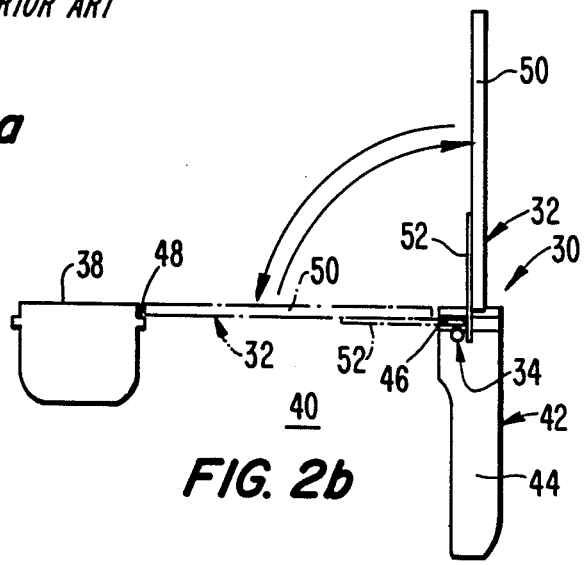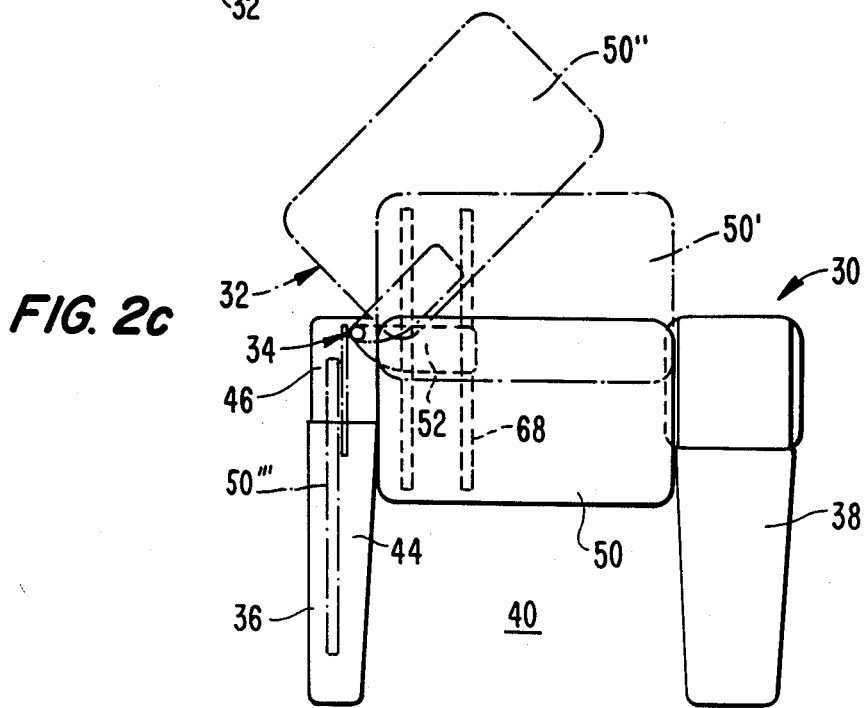

STOWABLE TABLE SYSTEM

BACKGROUND OF THE INVENTION

The present invention relates to stowable tables of the type commonly employed in vehicles, such as aircraft. More particularly, the invention involves an improved, simplified support system utilizing a single hinge mechanism for accommodating plural pivotal movements of the table in various planes of operation from its stowed position in the armrest of the vehicle seat to its position of use externally of the armrest.

A table that is stowed in a compartment contained in the armrest of an aircraft seat, or the like, must be moved, first, in a vertical plane from its stowed position in the compartment to a fully exposed position externally of the compartment and thereafter, in a lateral plane at right angles to the first plane in order to cause the table to assume a horizontal disposition with respect to the seated passenger. In stowable tables of the prior art, such compound movement of the tables requires the use of individual, separately mounted pivot hinges accommodating movement of the table in the respective planes. Where such tables have the further capability of being pivoted in the horizontal plane, as for example, to permit the passenger to exit the seat while the tray is in its horizontal disposition a still further hinge mechanism is required.

Such prior art tables, due to the need for individual hinge mechanisms for effecting pivotal movement into each position between their stowed position in the compartment and their position of use, are costly to fabricate and install and possess a greater propensity to malfunction. It is, accordingly, to the alleviation of such problem that the present invention is directed.

SUMMARY OF THE INVENTION

The present invention may be characterized in one aspect by the provision of a stowable table system of particular form and arrangement permitting the various functions of the previously required several hinge mechanisms to be undertaken and performed by a single hinge mechanism. The described system includes a table structure having a hinge element associated therewith that is capable of compound rotational movement. Also provided are hinge mount means configured for retaining the hinge element and for guiding its compound movement to permit movement of the table structure from its stowed position to its various positions of use. Limit stops are provided for positioning the hinge element and table structure for manipulation into the various desired positions.

For a better understanding of the invention, its operating advantages and the specific objects obtained by its use, reference should be made to the accompanying drawings and description which relate to a preferred embodiment thereof.

BRIEF DESCRIPTION OF THE DRAWINGS

FIGS. 1a, 1b and 1c are schematic side, front and plan representations, respectively, of an aircraft seat employing a stowable table organization of the prior art, the table being illustrated in its various operative positions;

FIGS. 2a, 2b and 2c are schematic representations similar to those of FIGS. 1a, 1b and 1c illustrating the stowable table system of the present invention;

DESCRIPTION OF THE PREFERRED EMBODIMENT

Figure 3:
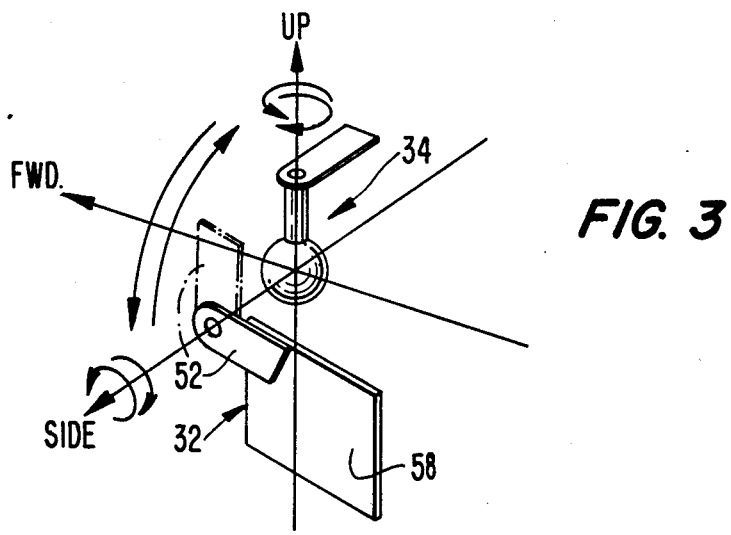
FIG. 3 is a schematic representation illustrating the compound movement capability of the hinge element of the present invention.

FIGS. 1a, 1b and 1c of the drawings illustrate schematically an aircraft chair 10 employing a stowable table 12 and a hinge system, indicated generally at 14, according to the prior art for operating the table 12 between its stowed position (FIG. 1a) and its position of use (FIG. 1b). FIG. 1c illustrates the table 12 angularly displaced from its position of use in order to facilitate access to or exit from the seat of the chair 10. As shown, such organizations normally include an armrest frame structure 15 forming a compartment 18 for stowage of the table 12. The hinge system 14 includes a first hinge mechanism 20 operative to permit the table structure to be manually pivoted in a vertical plane between its stowed position within the compartment 18 and a position exteriorly thereof. A second hinge mechanism 22 permits the table structure to be pivoted from its exposed position in the vertical plane to a substantially horizontal position of use across the passenger seated in the chair 10. Yet a third hinge mechanism 24 must be employed to permit the table 12 to be displaced in its horizontal attitude to permit ready access to or from the chair 10.

FIGS. 2a, 2b and 2c are schematic views corresponding to the views of FIGS. 1a, 1b and 1c showing the stowable table system of the present invention. The aircraft chair 30 employs a stowable table structure 32 operated by the single hinge mechanism, indicated generally at 34, and hereinafter more fully described. The chair 30, shown in FIG. 2c as being of the tandem type to accommodate side-by-side seating, includes an outside armrest 36 and a central armrest 38 oppositely spaced across the seating area 40. The outside armrest 36 employs a frame structure 42 that defines an interior compartment 44. The table structure 32 is shown by broken lines in FIG. 2a in its stowed position within the compartment 44 and in phantom lines in its exposed position exteriorly of the compartment, having been manually pivoted in a vertical plane between these positions by means of the hinge mechanism 34. Thereafter, and as shown in FIG. 2b, the table structure 32 can be laterally pivoted by means of the same hinge mechanism 34 into its horizontal position of use where it extends laterally across the seating area 40 of the chair 30 and is supported at one side by a support surface 46 on the outside armrest 36 and, preferably, also at its other side by a support shoulder 48 on the central armrest 38.

FIG. 2c illustrates the various positions attainable by the table structure 32 when it is horizontally disposed. The solid line representation, indicated by the numeral 50, shows the table body in its retracted, normal position of use across the seating area 40. The phantom representation, indicated as 50', shows the table body extended from its retracted position as is permitted by means of guide apparatus 52 described hereinafter. At 50" the table body is illustrated in an angularly displaced position to facilitate access to or from the seating area 40 and 50'" the table body is shown in its stowed position within the compartment 44.

All of the foregoing positional relationships of the table structure 32 with respect to the chair 30 are achieved by means of the mechanism which is hereinafter described in detail.

Figure 4:
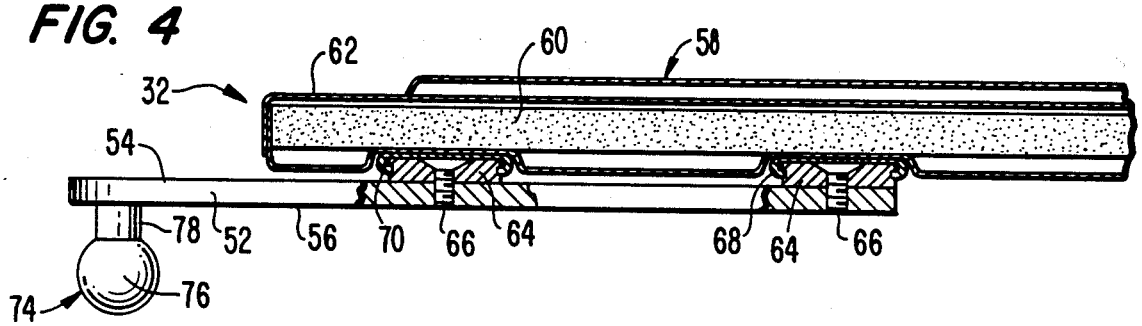
FIG. 4 is a fragmentary elevational view partly in section, of the table structure and hinge element of the present invention.
Figure 5:
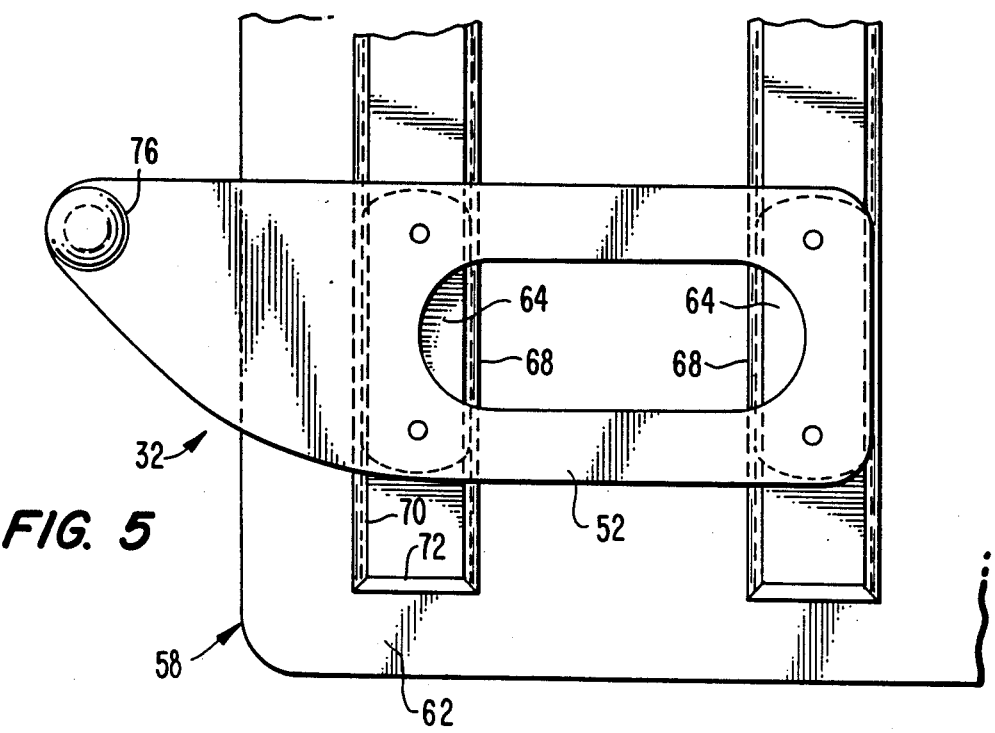
FIG. 5 is a fragmentary bottom plan view of the table structure and hinge element of FIG. 4.
Figure 6:
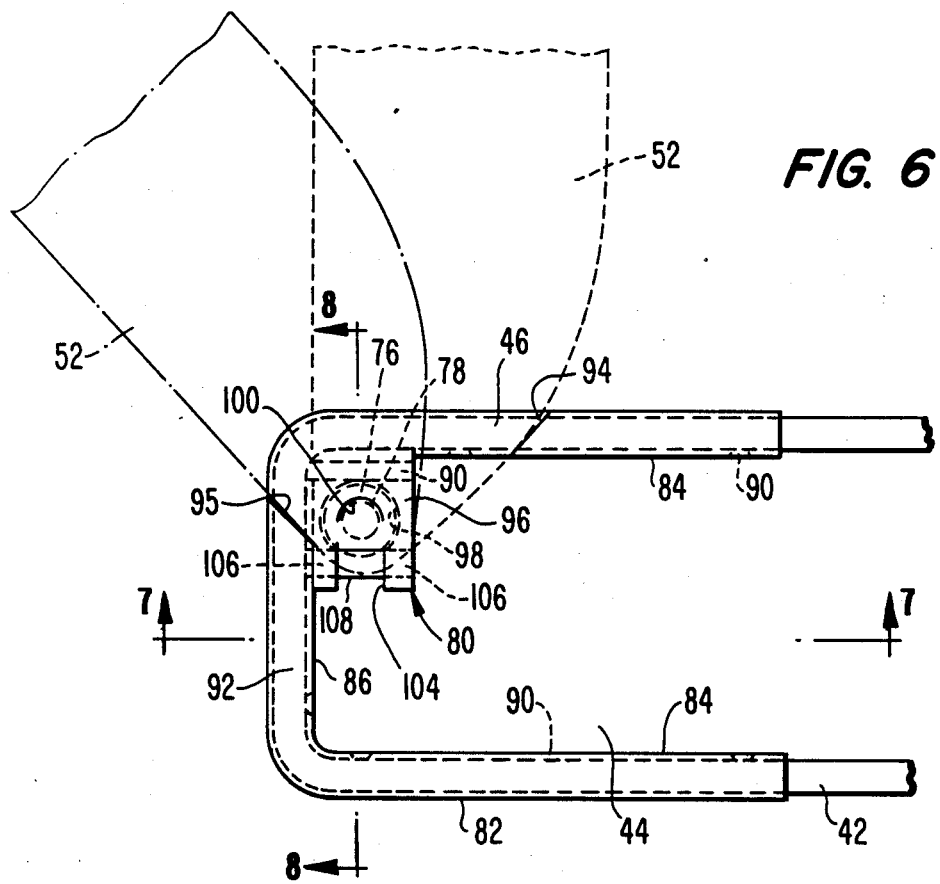
FIG. 6 is a plan view of the stowable table system of the present invention illustrating the table structure in various positions of use.
Figure 7:
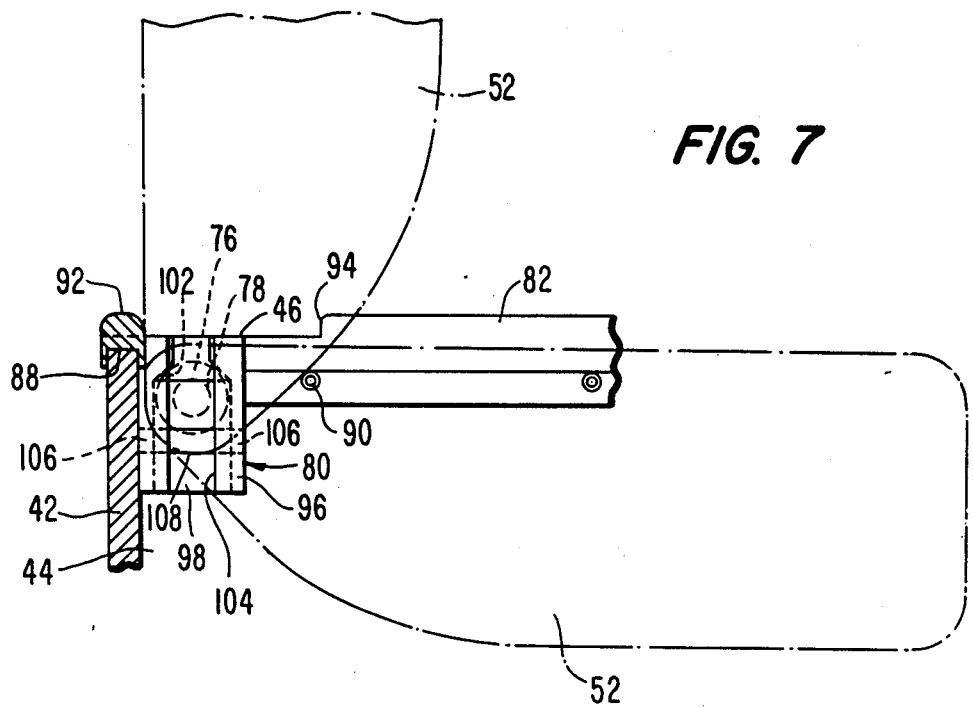
FIG. 7 is an elevational view taken along line 7—7 of FIG. 6 illustrating the table structure in various positions for stowage.

The table structure 32 of the described organization includes, as shown in FIGS. 4 and 5, a rotatable base 52 comprising an elongated, flat metal plate having oppositely facing upper and lower surfaces, 54 and 56, respectively. A table body 58, here shown as consisting of a flame retardant foam plastic core 60 within a formed plastic shell 62, is desirably attached to the upper surface 54 of base 52 for a fore-and-aft guided movement by means of appropriate guide apparatus. In the described arrangement this guide apparatus is shown as consisting of a pair of parallel, slotted guide bars 64 attached to the upper surface 54 of base 52 by means of screws 66. A pair of elongated tracks 68 having oppositely facing inturned side edges 70 for sliding engagement in the slots of the guide blocks 64 are fixed to the shell 62 forming the undersurface of the table body 50. The ends of the tracks 68 may be provided with inturned edges 72 to limit the extent of movement of the table body 50 with respect to the base 52 in order to prevent dislogement of the table body from the base 52.

The hinge mechanism 34 of the stowable table system comprises essentially a gimbal joint providing limited, guided, universal movement between the table structure 32 and that armrest, here shown as being the outside armrest 36, constaining the table-stowing compartment 44. The mechanism 34 includes a hinge element 74 comprising a spherical body 76 depending from the lower surface 56 of the table base 52 adjacent one end thereof. The body 76 is spaced from the base 52 and connected thereto by a stem 78.

The hinge element 34 is journaled for movement in a hinge mount, indicated generally as 80 in FIGS. 6 through 9. In the preferred embodiment, the hinge mount 80 is integrally cast as part of an escutcheon 82 attached to the forward end of frame structure 42 of the armrest 36 containing the compartment 44. As shown best in FIGS. 6 and 7, the escutcheon 82 is a generally U-shaped casting having oppositely spaced side legs 84 and a connecting leg 86 that are formed with a continuous recess 88 about their underside for reception on the sides and forward end of the armrest frame 42. Appropriately positioned screw holes 90 in the escutcheon casting permit its threaded connection to frame 42. The upper surface of the escuteheon 82 is shown as being formed with a crown 92 about its length, except in the region of the hinge mount 80 where there is provided a flat surface forming the support surface 46 for the table structure 32. As shown, the lateral extent of the support surface 46 is defined by oppositely facing stop shoulders 94 and 95 formed on the inner leg 84 and connecting leg 86 respectively of the escutcheon 82. In the described arrangement the shoulders 94 and 95 each are laterally disposed at about a ninety degree angle across the escutcheon surface to accommodate an included angular displacement of the table base 52 of about forty-five degrees, as hereinafter described.

The hinge mount 80 comprises a vertically elongated body 96 disposed on the escutcheon 82 at the nexus of the inner leg 84 and connecting leg 86 and has an upper surface that is coincident with the support surface 46. The body 96 contains an axial through-bore 98 for reception of the spherical body 76 of the hinge element 74. The upper end of the bore 98 is formed with a reduced diameter portion 100 sized to receive the hinge element stem 78 and providing in the bore a conically tapered bearing surface 102 for engagement with the spherical body 96. An elongated slot 104, shown as being slightly oversized from the reduced diameter bore portion 100, but smaller than the diameter of the bore 98, extends the full length of the outer surface of the hinge mount body 96 and communicates with the bore 98. Laterally aligned holes 106 are provided in the body 96 intermediate the ends of the slot 104 and displaced outwardly from the axis of the bore 98. These holes 106 receive a stop pin 108 which may be in the form of a stud, threaded at one end, for threaded connection with one of the holes 106.

Figure 8:
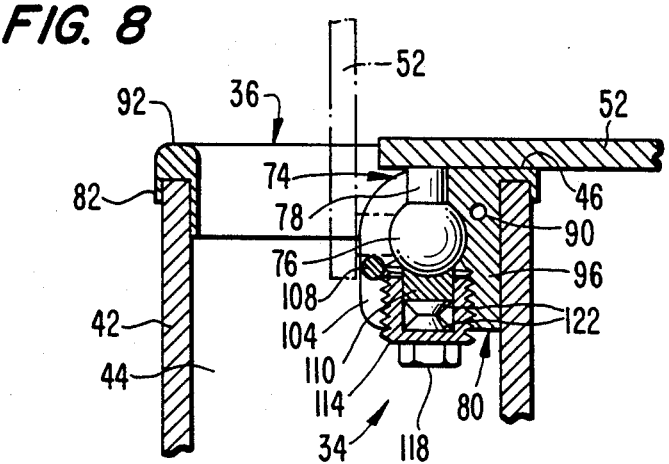
FIG. 8 is a sectional elevation of the assembled hinge mechanism of the stowable table system of the present invention.
Figure 9:
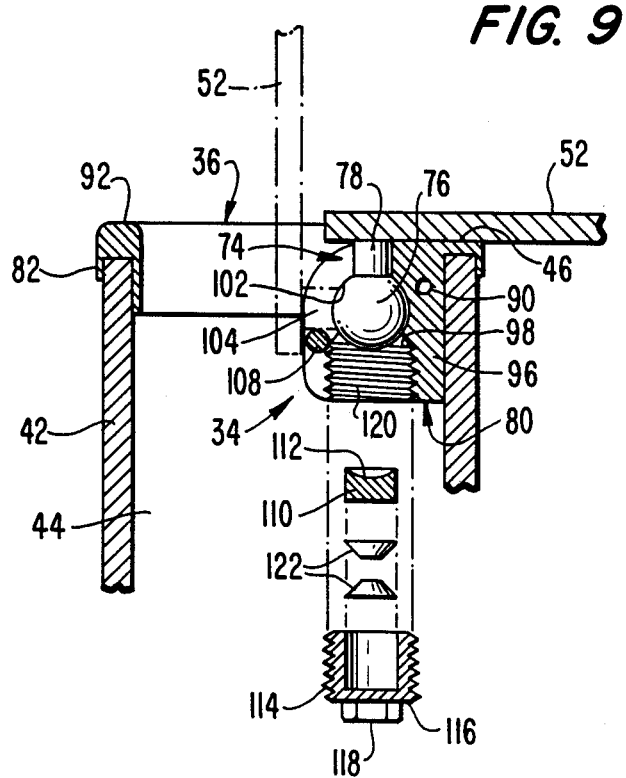
FIG. 9 is a view, similar to FIG. 8, illustrating an exploded representation of the component parts of the hinge mechanism of the present invention.

As best shown in FIGS. 8 and 9, the spherical body 76 of hinge element 74 is received in the bore 98 of the hinge mount 80 and journaled for rotational movement therein by means of a bearing pad 110 having an arcuately curved upper surface 112 that cooperates with the opposed conical bore shoulder 102 on body 96 for applying bearing pressure against the spherical body. The bearing pad 110 is retained in the hinge mount 80 by a retainer housing 114 that is an externally threaded cup-shaped member having a closed lower end 116 with an integrally-formed turning head 118. The retainer housing 114 is secured in the hinge mount body 96 by engagement of its threads with threads 120 formed in the lower portion of the bore 98.

Desirably the bearing pad 110 is spring biased against the hinge element body 76 for applying bearing pressure thereto. Accordingly, a spring member, here shown as being in the form of opposed conical spring washers 122, although other spring forms may be employed, is contained within the retainer housing 114 between the bearing pad 110 and the housing end 116. It will be apparent that the bearing pressure against the body 76 can be varied by threaded adjustment of the retainer 114 within the bore 98.

The operation of the hereindescribed stowable table system is as follows. When the hinge element 74 is assembled in the hinge mount 80 with the spherical body 76 spring biased between the bearing pad 110 and the conical bearing surface 102 it will be obvious that, as shown in FIG. 8, the base 52 of table structure 32 will be supportively engaged at one end by the escutcheon support surface 46. The table base 52 can be rotatably drawn against the stop shoulder 94 on the escutcheon 82 whereupon the table structure 32 can be considered to be in its use position indicated at 50 in FIG. 2c with the free end of the table body 58 supported by the support shoulder 48 on the armrest 38. Positional adjustment of the table body 58 in this position as indicated at 50' in FIG. 2c is accommodated by the relative movement permitted between the table base 52 and table body 58 by the cooperation between the guide bars 64 and tracks 68.

Angular displacement of the table structure 32, as indicated at 50" in FIG. 2c, is obtained by rotation of the table structure forwardly in its horizontal attitude until the side edge of the table base engages the stop shoulder 95 on the escutcheon 82.

Stowage of the table structure 32 is obtained by simple pivoting structure vertically as shown by the arrows in FIG. 2b whereupon the hinge element 74 will rotate in the hinge mount 80 with the stem 78 traversing the slot 104 until it engages the stop pin 108. The table structure 32 is thereby vertically disposed as shown by the solid line representation in FIG. 2b and the phantom line representation in FIG. 2a. Thereafter, with the stem 78 engaging stop pin 108 the table structure 32 can be rotated in the vertical plane to position it in the compartment 44. These operational steps are reversed in order to retrieve the table structure from the compartment 44 and dispose it in its position of use.

From the above it should be apparent that the described stowable table system provides a simple, inexpensive organization when compared with related apparatus of the prior art. The described arrangement permits a single hinge mechanism to produce manifold movements in three principle planes of operation as illustrated schematically in FIG. 3 where, in the past, these movements could only be achieved through the use of a multitude of hinge mechanisms. Moreover, due to the reduction in the number of parts required for operation of the disclosed apparatus, it will be appreciated that maintenance of the apparatus is simplified.

It will be understood that various changes in the details, materials and arrangement of parts which have been described and illustrated in order to explain the nature of the invention can be made by those skilled in the art within the principle and scope of the invention as expressed in the appended claims.

What is claimed is:

1. A stowable table system adapted for use in a vehicle seat, or the like, for pivotal movement of a table body about three substantially mutually perpendicular axes between a stowed position and a position of use, comprising:
    a table structure including said table body;
    a hinge element attached to said table structure including a spherical body spaced from said table structure and a stem interconnecting said spherical body and said table structure;
    a hinge mount securing said hinge element for movement with respect to said seat including a body containing an elongated internal bore, a fixed surface at one end of said bore for bearing engagement with one side of said spherical body, a resiliently biased movable surface in facing relation to said fixed surface for bearing engagement with the other side of said spherical body, an elongated guide slot substantially coextensive with said bore extending through said body to the exterior thereof and being sized to receive said stem for translatory and rotational motion, and limit means at opposite ends of said guide slot against which said stem is rotatable, one of said limit means being disposed at one end of said guide slot to angularly displace said table structure in a vertical plane to and from said stowed position and the other of said limit means being disposed at the other end of said guide slot to angularly displace said table structure in a horizontal plane to and from said position of use.

2. The stowable table system as recited in claim 1 in which said table structure includes a table base, and means on said table base for attaching said table body for translatory guided lateral movement.

3. The stowable table system as recited in claim 2 in which said means for attaching said table body to said table base for guided translatory lateral movement comprises at least one bearing bar fixedly secured to one of the members of said table structure and means on the other of said members engaging said at least one bearing bar for locked, sliding movement therealong.

4. The stowable table system as recited in claim 2 in which said means for attaching said table body to said table base for guided translatory movement comprises at least one bearing bar fixedly secured to one of the members of said table structure and means on the other of said members engaging said at least one bearing bar for locked, sliding movement therealong.

5. The stowable table structure as recited in claim 1 including angularly spaced limit stop means engageable with said table structure for restricting the extent of displacement of said table structure in said horizontal plane.

6. The stowable table system as recited in claim 1 including means for adjusting the bearing pressure on said spherical body comprising a bearing pad containing said movable surface and an axially movable retainer housing threadedly received in said bore for adjusting the position of said bearing pad with respect to said spherical body.

7. The stowable table system as recited in claim 1 in which said hinge mount limit means includes a pin extending transversely of said guide slot and operative to engage said stem for rotational movement.

8. For use in a chair having a seat and an armrest containing a compartment adapted to receive a table body in stowed position, a stowable table system, comprising:
    a table structure structure including said table body;
    a hinge element attached to said table structure including a spherical body spaced from said table structure and a stem interconnecting said spherical body to the underside of said table structure; and
    a hinge mount securing said hinge element for movement producing pivotal movement of said table body about three mutually perpendicular axes between a stowed position within said compartment and a position of use exteriorly thereof, said hinge mount including a body fixedly secured to said armrest and containing a vertically elongated bore having a fixed surface at the upper end thereof and a resiliently biased surface movable in said bore in facing relation to said fixed surface for bearingly engaging and retaining said spherical body for compound pivotal movement therein, an elongated guide slot substantially coextensive with said bore extending through said body to the exterior thereof and being sized to receive said stem for translatory and rotational motion, and limit means at opposite ends of said guide slot against which said stem is rotatable, one of said limit means being disposed at one end of said guide slot to displace said table structure in a vertical plane to and from a stowed position in said compartment and other of said limit means being disposed at the other end of said guide slot to angularly displace said table structure in a horizontal plane exteriorly of said compartment to and from said position of use.

9. The stowable table system as recited in claim 8 including angularly spaced limit stops on said armrest and engageable with said table structure for restricting the extent of angular displacement of said table structure in said horizontal plane.

10. The stowable table system as recited in claim 8 including means for adjusting the bearing pressure on said spherical body comprising a bearing pad containing said movable surface and an axially movable retainer housing threadedly received in said bore for adjusting the position of said bearing pad with respect to said spherical body.

11. The stowable table system as recited in claim 8 in which said hinge mount limit means includes a substantially horizontally disposed stud pin extending transversely of said guide slot and operative to engage said stem for rotational movement about a horizontal axis whereby said table structure is angularly displaced in a vertical plane to and from said stowed position in said compartment.

* * * * *